(12) United States Patent
Hamedi et al.

(10) Patent No.: US 10,592,074 B2
(45) Date of Patent: Mar. 17, 2020

(54) SYSTEMS AND METHODS FOR ANALYZING VISUAL CONTENT ITEMS

(71) Applicant: Adhark, Inc., South Boston, MA (US)

(72) Inventors: Jehan Hamedi, South Boston, MA (US); Zachary McDonald Halloran, Braintree, MA (US)

(73) Assignee: Adhark, Inc., South Boston, MA (US)

( * ) Notice: Subject to any disclaimer, the term of this patent is extended or adjusted under 35 U.S.C. 154(b) by 0 days.

(21) Appl. No.: 16/403,336

(22) Filed: May 3, 2019

(65) Prior Publication Data
US 2019/0339824 A1 Nov. 7, 2019

Related U.S. Application Data

(60) Provisional application No. 62/666,349, filed on May 3, 2018, provisional application No. 62/727,496, filed on Sep. 5, 2018.

(51) Int. Cl.
| | | |
|---|---|---|
| *G06F 3/048* | (2013.01) | |
| *G06F 3/0482* | (2013.01) | |
| *G06K 9/00* | (2006.01) | |
| *G06F 16/33* | (2019.01) | |
| *G06F 17/27* | (2006.01) | |
| *G06N 20/00* | (2019.01) | |
| *G06K 9/62* | (2006.01) | |

(52) U.S. Cl.
CPC .......... *G06F 3/0482* (2013.01); *G06F 16/334* (2019.01); *G06F 17/2705* (2013.01); *G06K 9/00684* (2013.01); *G06K 9/6215* (2013.01); *G06N 20/00* (2019.01)

(58) Field of Classification Search
CPC ..................................................... G06F 3/048
See application file for complete search history.

(56) References Cited

U.S. PATENT DOCUMENTS

2010/0287053 A1\* 11/2010 Ganong ............. G06K 9/00248
705/14.66

\* cited by examiner

*Primary Examiner* — Pei Yong Weng
(74) *Attorney, Agent, or Firm* — Foley & Lardner LLP

(57) ABSTRACT

Systems and methods for implementing an artificial intelligence-powered smart gallery are provided. The smart gallery can be a software application that includes an ensemble of visual content-related features for end users. These features can include, but are not limited to, a set of user interactions to be performed on visual media or other content items, recommendations on and for a user's content items, analytical evaluations of a user's content items, as well as intelligent selection and optimization functions to enhance the performance of at least one of the user's content items. The presently disclosed systems can be integrated directly with an image management service or photo gallery that is part of a mobile operating system or other non-mobile software applications residing on a computing device.

28 Claims, 11 Drawing Sheets

SYSTEMS AND METHODS FOR ANALYZING VISUAL CONTENT ITEMS

CROSS-REFERENCE TO RELATED APPLICATIONS

This application claims priority to Unites States Provisional Patent Application No. 62/666,349, titled "Systems and Methods for Analyzing Visual Content Items," filed on May 3, 2018, and to Unites States Provisional Patent Application No. 62/727,496, titled "Systems and Methods for Analyzing Visual Content Items," filed on Sep. 5, 2018, each of which is hereby incorporated by reference in its entirety.

BACKGROUND OF THE DISCLOSURE

A user can store content items, such as photos and videos, on a computing device. For example, a computing device may include input devices such as a camera and a microphone with which the user can capture images and video to be stored on the computing device. The user may also share the content items with others, for example by publishing the content items through one or more content publishers.

SUMMARY OF THE DISCLOSURE

At least one aspect of this disclosure is directed to a system for analyzing visual content items. The system can include a memory. The system can include one or more processors coupled to the memory. The one or more processors can include programmed instructions to access, from a mobile computing device, a plurality of visual content items captured by the mobile computing device. The one or more processors can include programmed instructions to evaluate the plurality of visual content items to determine a respective similarity score between the plurality of visual content items and each of a plurality of identity categories. Evaluating the plurality of visual content items can include applying at least one machine learning model to the plurality of visual content items for each of the plurality of identity categories. The one or more processors can include programmed instructions to determine a subset of the identity categories for which the respective similarity scores exceed a similarity threshold. The one or more processors can include programmed instructions to generate information corresponding to a first graphical user interface (GUI). The first GUI can include a visual representation of each identity category of the subset of identity categories and a user-selectable interface element for each identity category of the subset of identity categories. The one or more processors can include programmed instructions to provide the information corresponding to the first GUI to the mobile computing device to cause the mobile computing device to render the first GUI via an electronic display of the mobile device.

In some implementations, the one or more processors further include programmed instructions to receive a first user input corresponding to a selection of at least one identity category of the subset of identity categories. In some implementations, the one or more processors further include programmed instructions to identify a target audience for a user of the mobile computing device. In some implementations, the one or more processors further include programmed instructions to determine activity data for a plurality of published content items retrieved from at least one content source. The published content items can be selected based on the at least one identity category. The activity data can include data relating to engagement of viewers with the plurality of published content items. In some implementations, the one or more processors further include programmed instructions to train a second machine learning model to determine a predicted performance score based on the published content items and the activity data. In some implementations, the one or more processors further include programmed instructions to evaluate each visual content item of the plurality of visual content items using the second machine learning model to generate a respective predicted performance score for each visual content item of the plurality of visual content items. In some implementations, the one or more processors further include programmed instructions to generate information corresponding to a second GUI. The second GUI can include a visual representation of at least a subset of the plurality of visual content items and the respective predicted performance scores for the subset of the plurality of visual content items. In some implementations, the one or more processors further include programmed instructions to provide the information corresponding to the second GUI to the mobile computing device to cause the mobile computing device to render the second GUI via the electronic display of the mobile device.

In some implementations, the one or more processors further include programmed instructions to provide information corresponding to a third GUI to the mobile computing device. The third GUI can include a list of a plurality of candidate audiences. In some implementations, the one or more processors further include programmed instructions to receive, from the mobile computing device, a second user input corresponding to a selection of a first candidate audience of the plurality of candidate audiences. In some implementations, the one or more processors further include programmed instructions to identify the target audience based on the second user input.

In some implementations, the one or more processors further include programmed instructions to access a first account on the target platform corresponding to the user of the mobile computing device. In some implementations, the one or more processors further include programmed instructions to identify a plurality of second accounts on the target platform. Each second account can be linked with the first account. In some implementations, the one or more processors further include programmed instructions to identify the target audience based on the plurality of second accounts.

In some implementations, the one or more processors further include programmed instructions to detect that a new visual content item has been captured by the mobile computing device. The new visual content item may not be included in the plurality of visual content items. In some implementations, the one or more processors further include programmed instructions to automatically evaluate the new visual content item using the second machine learning model based on the published content items and the activity data to generate a respective predicted performance score for the new visual content item, responsive to detecting that the new visual content item has been capture by the mobile computing device.

In some implementations, the one or more processors further include programmed instructions to generate the information corresponding to the second GUI such that the second GUI includes the visual representations of the subset of the visual content items arranged in a rectangular array. In some implementations, the respective predicted performance scores can overlap at least a portion of the visual representations of their respective visual content items within the second GUI.

In some implementations, the one or more processors further include programmed instructions to access a new visual content item from a content source remote from the mobile computing device. In some implementations, the one or more processors further include programmed instructions to evaluate the new visual content item using the second machine learning model based on the published content items and the activity data to generate a respective predicted performance score for the new visual content item. In some implementations, the one or more processors further include programmed instructions to determine that the predicted performance score for the new visual content item exceeds a predetermined predicted performance threshold. In some implementations, the one or more processors further include programmed instructions to provide the new visual content item to the mobile computing device.

In some implementations, the one or more processors further include programmed instructions to receive, from the mobile computing device, a user input specifying a time period. In some implementations, the one or more processors further include programmed instructions to determine a timestamp of each visual content item of the plurality of visual content items. In some implementations, the one or more processors further include programmed instructions to identify the subset of the plurality of visual content items for the second GUI such that the respective timestamp of each visual content item of the subset of visual content items falls within the time period.

In some implementations, the one or more processors further include programmed instructions to identify a target content item characteristic. In some implementations, the one or more processors further include programmed instructions to evaluate each visual content item of the plurality of visual content items to determine whether each visual content item includes the target content item characteristic. In some implementations, the one or more processors further include programmed instructions to identify the subset of the plurality of visual content items for the second GUI such that each visual content item of the subset of visual content items includes the target content item characteristic. In some implementations, the one or more processors further include programmed instructions to receive, from the mobile computing device, a second user input corresponding to a search criteria text string. In some implementations, the one or more processors further include programmed instructions to parse the search criteria text string to identify the target content item characteristic. In some implementations, the one or more processors further include programmed instructions to receive, from the mobile computing device, a second user input corresponding to an audio signal. In some implementations, the one or more processors further include programmed instructions to parse the audio signal to identify the target content item characteristic.

In some implementations, the one or more processors further include programmed instructions to identify a target content platform. In some implementations, the one or more processors further include programmed instructions to select the at least one content source from which the published content items are retrieved to correspond to the target content platform.

In some implementations, the one or more processors further include programmed instructions to train the second machine learning model based in part on the target audience. In some implementations, the one or more processors further include programmed instructions to train the second machine learning model using one or more features extracted from image data corresponding to at least one of the published content items.

In some implementations, the one or more processors further include programmed instructions to evaluate the plurality of visual content items to determine the respective similarity score between the plurality of visual content items and each of the plurality of identity categories based on at least one of a percentage of the plurality of visual content items that correspond to each identity category or a quality rating of at least one of the plurality of visual content items that corresponds to each identity category.

At least another aspect of this disclosure is directed to a method for analyzing visual content items. The method can include accessing, from a mobile computing device, a plurality of visual content items captured by the mobile computing device. The method can include evaluating the plurality of visual content items to determine a respective similarity score between the plurality of visual content items and each of a plurality of identity categories. Evaluating the plurality of visual content items can include applying at least one machine learning model to the plurality of visual content items for each of the plurality of identity categories. The method can include determining a subset of the identity categories for which the respective similarity scores exceed a similarity threshold. The method can include generating information corresponding to a first GUI. The first GUI can include a visual representation of each identity category of the subset of identity categories and a user-selectable interface element for each identity category of the subset of identity categories. The method can include providing the information corresponding to the first GUI to the mobile computing device to cause the mobile computing device to render the first GUI via an electronic display of the mobile device.

In some implementations, the method can include receiving a first user input corresponding to a selection of at least one identity category of the subset of identity categories. In some implementations, the method can include identifying a target audience for a user of the mobile computing device. In some implementations, the method can include determining activity data for a plurality of published content items retrieved from at least one content source. The published content items can be selected based on the at least one identity category. The activity data can include data relating to engagement of viewers with the plurality of published content items. In some implementations, the method can include training a second machine learning model to determine a predicted performance score based on the published content items and the activity data. In some implementations, the method can include evaluating each visual content item of the plurality of visual content items using the second machine learning model to generate a respective predicted performance score for each visual content item of the plurality of visual content items. In some implementations, the method can include generating information corresponding to a second GUI. The second GUI can include a visual representation of at least a subset of the plurality of visual content items and the respective predicted performance scores for the subset of the plurality of visual content items. In some implementations, the method can include providing the information corresponding to the second GUI to the mobile computing device to cause the mobile computing device to render the second GUI via the electronic display of the mobile device.

In some implementations, the method can include providing information corresponding to a third GUI to the mobile computing device. The third GUI can include a list of a plurality of candidate audiences. In some implementations, the method can include receiving, from the mobile computing device, a second user input corresponding to a selection of a first candidate audience of the plurality of candidate audiences. In some implementations, the method can include identifying the target audience based on the second user input.

In some implementations, the method can include accessing a first account on the target platform corresponding to the user of the mobile computing device. In some implementations, the method can include identifying a plurality of second accounts on the target platform. Each second account can be linked with the first account. In some implementations, the method can include identifying the target audience based on the plurality of second accounts.

In some implementations, the method can include detecting that a new visual content item has been captured by the mobile computing device. The new visual content item may not be included in the plurality of visual content items. In some implementations, the method can include evaluating the new visual content item using the second machine learning model based on the published content items and the activity data to generate a respective predicted performance score for the new visual content item, responsive to detecting that the new visual content item has been capture by the mobile computing device.

In some implementations, the method can include generating the information corresponding to the second GUI such that the second GUI includes the visual representations of the subset of the visual content items arranged in a rectangular array. The respective predicted performance scores can overlap at least a portion of the visual representations of their respective visual content items within the second GUI.

In some implementations, the method can include accessing a new visual content item from a content source remote from the mobile computing device. In some implementations, the method can include evaluating the new visual content item using the second machine learning model based on the published content items and the activity data to generate a respective predicted performance score for the new visual content item. In some implementations, the method can include determining that the predicted performance score for the new visual content item exceeds a predetermined predicted performance threshold. In some implementations, the method can include providing the new visual content item to the mobile computing device.

In some implementations, the method can include receiving, from the mobile computing device, a user input specifying a time period. In some implementations, the method can include determining a timestamp of each visual content item of the plurality of visual content items. In some implementations, the method can include identifying the subset of the plurality of visual content items for the second GUI such that the respective timestamp of each visual content item of the subset of visual content items falls within the time period.

In some implementations, the method can include identifying a target content item characteristic. In some implementations, the method can include evaluating each visual content item of the plurality of visual content items to determine whether each visual content item includes the target content item characteristic. In some implementations, the method can include identifying the subset of the plurality of visual content items for the second GUI such that each visual content item of the subset of visual content items includes the target content item characteristic. In some implementations, the method can include receiving, from the mobile computing device, a second user input corresponding to a search criteria text string. In some implementations, the method can include parsing the search criteria text string to identify the target content item characteristic. In some implementations, the method can include receiving, from the mobile computing device, a second user input corresponding to an audio signal. In some implementations, the method can include parsing the audio signal to identify the target content item characteristic.

In some implementations, the method can include identifying a target content platform. In some implementations, the method can include selecting the at least one content source from which the published content items are retrieved to correspond to the target content platform.

In some implementations, the method can include training the second machine learning model based in part on the target audience. In some implementations, the method can include training the second machine learning model using one or more features extracted from image data corresponding to at least one of the published content items.

In some implementations, the method can include evaluating the plurality of visual content items to determine the respective similarity score between the plurality of visual content items and each of the plurality of identity categories based on at least one of a percentage of the plurality of visual content items that correspond to each identity category or a quality rating of at least one of the plurality of visual content items that corresponds to each identity category.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
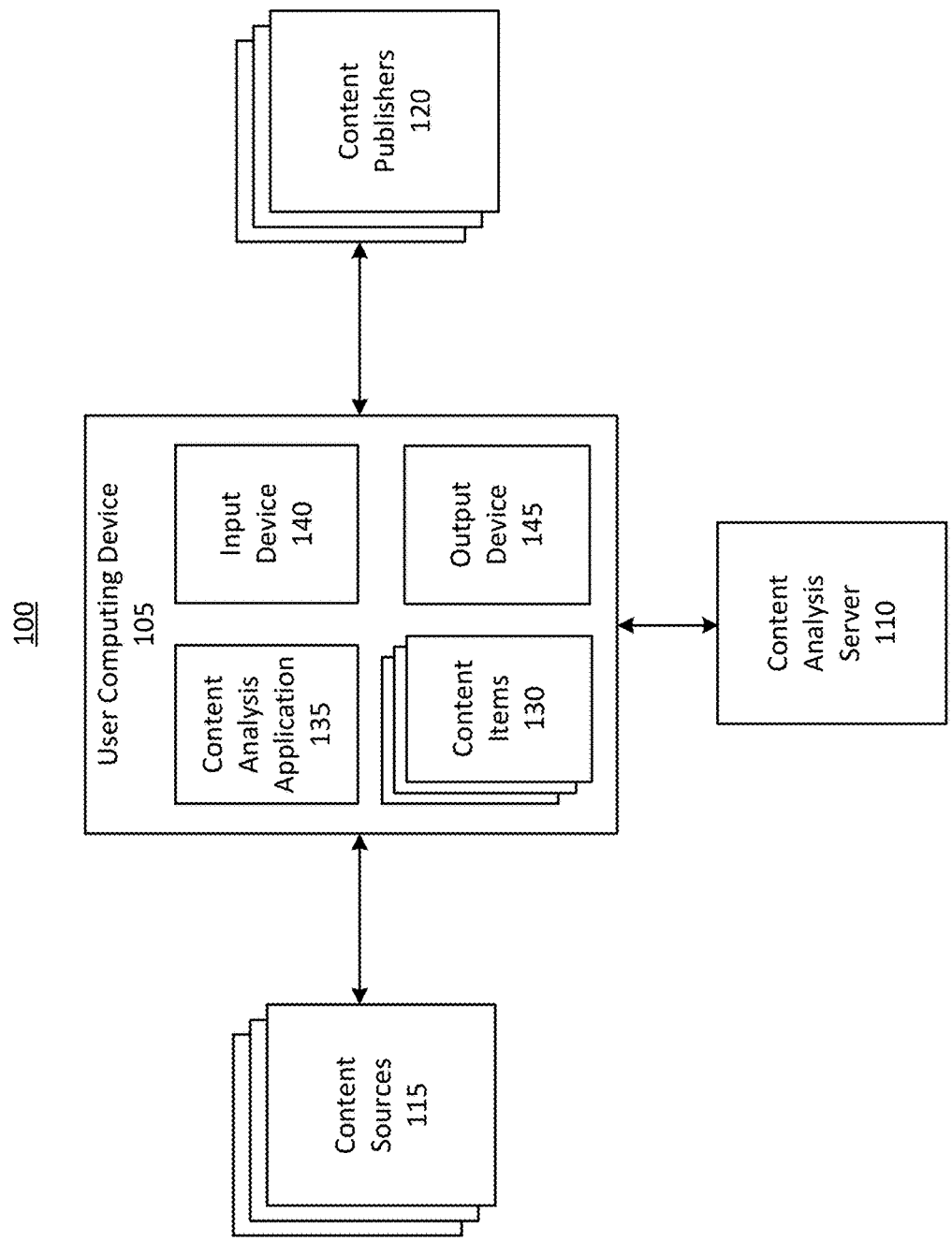
FIG. 1 illustrates an example system for analyzing content items, according to an illustrative implementation.

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems and methods for implementing an artificial intelligence-powered smart gallery. The smart gallery can be a software application that includes an ensemble of visual content-related features for end users. These features can include, but are not limited to, a set of user interactions to be performed on visual media or other content items, recommendations on and for a user's content items, analytical evaluations of a user's content items, as well as intelligent selection and optimization functions to enhance the performance of at least one of the user's content items. The presently disclosed systems can be integrated directly with an image management service or photo gallery that is part of a mobile operating system or other non-mobile software applications residing on a computing device.

One technical problem presented in conventional computerized systems for storing and electronically publishing or sharing visual content items is the large amount of memory that can be required for storage of the content items. For example, due to their small physical sizes, mobile computing devices often have relatively small storage capacity. Users may wish to store hundreds, thousands, or more content items on their devices, but may be unable to do so because the memory capacity of the devices is insufficient. This technical problem becomes more challenging as typical photo and video resolutions continue to increase over time, resulting in larger file sizes for each content item.

Another technical problem presented in such systems relates to the large amount of bandwidth required in order for users to share or publish content items stored on their computing devices, which typically involves transmitting information corresponding to the content items (e.g., image or video data) to a server over a computer network such as the Internet. Due to the large file size for each content item and the volume of content items many users wish to share, a large amount of bandwidth can be consumed by this process. As file sizes continue to increase over time (e.g., due to increased resolutions of cameras included in mobile computing devices), more network bandwidth is required to share the content items captured and stored on users' devices.

The systems and methods disclosed herein can help to address these technical problems by reducing the number of content items stored on user computing devices and shared across computer networks. For example, users are often unable to determine which content item of a set of related content items is likely to be the highest performing (e.g., most visually favored by a particular target audience). As a result, the user may choose to save and/or share all of the content items in the set. This disclosure provides techniques for evaluating and ranking content items in a quantitative manner to identify the content items that are predicted to perform best. As a result, the systems and methods of this disclosure can help to reduce the number of content items that the user wishes to store or share. For example, the user is more likely to delete content items that are not ranked highly by the systems and methods of this disclosure, while saving and sharing only the higher-ranked content items. In some implementations, the systems and methods of this disclosure can automatically remove content items from a mobile computing device in response to determining that the content items are not predicted to perform well among a target audience. The systems and methods of this disclosure can also prevent or discourage publishing of such lower-ranked content items. Accordingly, the available storage capacity of computing devices and the available bandwidth of computer networks for sharing content items can be used more efficiently.

FIG. 1 illustrates an example system 100 for analyzing content items, according to an illustrative implementation. The system 100 includes a user computing device 105 in communication with a content analysis server 110, a plurality of content sources 115, and a plurality of content publishers 120. The user computing device 105 includes a plurality of content items 130, a content analysis application 135, an input device 140, and an output device 145.

In some implementations, the user computing device 105 can be a mobile computing device, such as a smartphone. The content items 130 can be stored, contained, or otherwise accessible within a photo gallery application. For example, the content items 130 may be visual media files, such as photos and videos. For a prolific user, there may be hundreds or thousands of content items 130 stored on the user computing device 105. These content items 130 may exist in a temporary or permanent state in the user's photo gallery application. In some implementations, the input device 140 can include any input device configured to allow a user to capture or generate the content items 130. For example, the input device 140 can be or can include a camera and/or a microphone. The output device 145 can be a device configured to display the content items 130. For example, the output device 145 can be an electronic display screen included in or coupled to the user computing device 105. For the purpose of the analytical features discussed further below, the content items 130 can be considered candidate content items that may be analyzed using artificial intelligence to inform the user's publishing (e.g., sharing, posting, etc.) behavior with respect to the content items 130 on at least one platform, such as a social media website, hosted by the content publishers 120.

In some implementations, the user computing device 105 may instead be a non-mobile device, such as a desktop computer or a laptop computer. The analysis techniques disclosed herein may include features that are provided by natively embedded software, such as the content analysis application 135. In some other embodiments, these features may be provided by a remote computing device, such as the content analysis server 110. For example, the content analysis server 110 and the user computing device 105 may communication with one another via a computer network, such as the Internet.

In some implementations, the system 100 can work to inform such actions as the capture, creation, editing, selection, optimization, sharing, storing, and distribution, of the content items 130. These content items 130, which can include at least one still image, photograph, video file, or other creative work, can be accessible by at least one end user on a computing or mobile device.

With regards to the content items 130 that the user shares via any of the content publishers 120, the content analysis application 135 or the content analysis server 110 can be configured to learn from the success and failure of visual content items (including any of the content items 130) that the user has published for viewing by an audience, which may include any group of other users that views of the shared content items. To achieve this, the content analysis application 135, the content analysis server 110, or a combination thereof can be configured to implement a set of artificial intelligence techniques and heuristics to learn from data in order to inform subsequent recommendations with the goal of improving the performance of future shared visual content. For example, the content analysis application 135 or the content analysis server 110 may generate "smart gallery" functionality for the user computing device 105, which can allow the user computing device 105 to display recommendations in connection with any of the content items 130. Example user interfaces for such a smart gallery are described further below in connection with FIGS. 2-6.

As the user interacts with the smart gallery, the content analysis application 135 or the content analysis server 110 can provide at least one artificial intelligence, machine learning, or other statistical technique to analyze and learn from the user's behavior and/or audience engagement. In some implementations, audience engagement can include any type of interaction by an audience member with a content item 130 that the user has shared via the content publishers 120. For example, an audience member may engage with a published content item 130 by viewing it, liking it, sharing it, or commenting on it. The usage patterns and visual performance learned through these analysis methods can be used by the content analysis application 135 or the content analysis server 110 to improve the recommendations made to the user experience over time.

In some implementations, the content analysis application 135 or the content analysis server 110 can analyze new content items 130 when the user captures a new photo, for example via the input device 140. In some implementations, this process can occur when the user selects a content item 130 that is already stored on the user computing device 105. In some implementations, this can occur when the user interacts with a visual content item on the web (e.g., a content item provided by one of the content sources 115) or in a particular software application. In some implementations, the user may be able to interact with the smart gallery via voice commands. For example, the input device 140 can be a microphone configured to record audio data corresponding to the user's voice, and the content analysis application 135 or the content analysis server 110 can process the received audio data to implement the functionality described further below.

User Calibration

When the user accesses the smart gallery provided by the content analysis application 135 or the content analysis server 110 via the user computing device 105 for the first time, the content analysis application 135 or the content analysis server 110 can initiate a calibration process. The calibration process can work to personalize the functionality of the smart gallery to the particular user. For example, this can include personalizing visual settings or preferences, determining relevant audiences of the user, and determining other usage and recommendation criteria. In some implementations, the content analysis application 135 or the content analysis server 110 may also learn from a selection of "favorite" visual content (e.g., a subset of the content items 130 indicated as being preferred by the user) that is informed by the user's preferences. In some implementations, the content analysis application 135 or the content analysis server 110 can perform this functionality in an automated fashion. In some other implementations, the content analysis application 135 or the content analysis server 110 can perform this functionality in response to actions taken by the user.

The calibration process performed by the 135 or the 110 can initiate a series of visual analysis methods on at least one of the content items 130 (e.g., at least one photo stored on a camera roll or photo library of the user computing device 105. These analysis methods can include analyzing the content items 130 through using at least one artificial intelligence technique. The calibration process can also connect with other relevant application software on the user computing device 105 to gain more contextual information about the user in order to provide a more personalized experience.

Audience Matching

One aspect of the calibration process described above can include selection of "audiences" to associate with the user of the user computing device 105. An audience may include a single other user of a platform (e.g., an application software, website, or a social media network) provided by any of the content publishers 120 that the user desires to appeal to or communicate with. For example, an audience may be the user's followers on a social networking site such as Instagram. In another example, an audience may be more broadly defined as a demographic group, such as "Men ages 18-24." An audience may also include an interest group, such as "Fashionistas" or "Working Professionals." An audience may also be or may include the user's friends and family. In some implementations, audiences may also be selected as a subset of users within a particular geographic area, such as the American midwest, the entire United States, a foreign country, a particular city or even the entire world. In some implementations, an audience can be defined by a combination of characteristics, such as behaviors, preferences, demographics, interests, etc.

A defined audience as describe above can be an important factor to be used by the content analysis application 135 or the content analysis server 110 as the basis upon which analytical evaluations are performed on the user's content items 130. For example, the content analysis application 135 or the content analysis server 110 can be configured to detect and record the contextual information and visual preferences of the audience through the audience's online activities, reactions, and behavior, (e.g., via the content publishers 120) to inform the recommendations and predictions that are generated by the content analysis application 135 or the content analysis server 110 for the user with regard to the content items 130. In some implementations, the information that the content analysis application 135 or the content analysis server 110 learns about the audience's behavior and preferences can be used to inform an artificial intelligence model for that audience. The artificial intelligence model can learn from data that is specific to that audience, and can represent a simulation of that audience, thereby allowing the content analysis application 135 or the content analysis server 110 to provide a prediction to the user regarding the likely reaction of the audience to each of the content items 130. Stated differently, the content analysis application 135 or the content analysis server 110 can provide an interface through which the user can view simulated reactions from the audience to the content items 130 in real-time.

Several different approaches can be taken in order to determine the most appropriate and relevant audience(s) for the device user. For example, the content analysis application 135 or the content analysis server 110 can receive input from the user, explicitly informing the content analysis application 135 or the content analysis server 110 of the user's target audience. In another example, the content analysis application 135 or the content analysis server 110 can determine an audience by accessing the user's social media account followers or other users connected to the user through any platform provided by the content publishers 120. In another example, the content analysis application 135 or the content analysis server 110 may perform a sophisticated audience-to-user matching process. In this approach, the content analysis application 135 or the content analysis server 110 can analyze the content items 130 stored on the user computing device 105, as well as any data that is extractable via the user's social media accounts or other platforms, in order to match an audience that fits the user's visual content items and preferences. In this way, the audience can be paired to the user intelligently by matching information corresponding to the user's contacts, social followings, posting history, etc. One or more artificial intelligence models may be used in discovering the most accurate match of an audience for the user.

Configuring Desired Platforms

Figure 2:
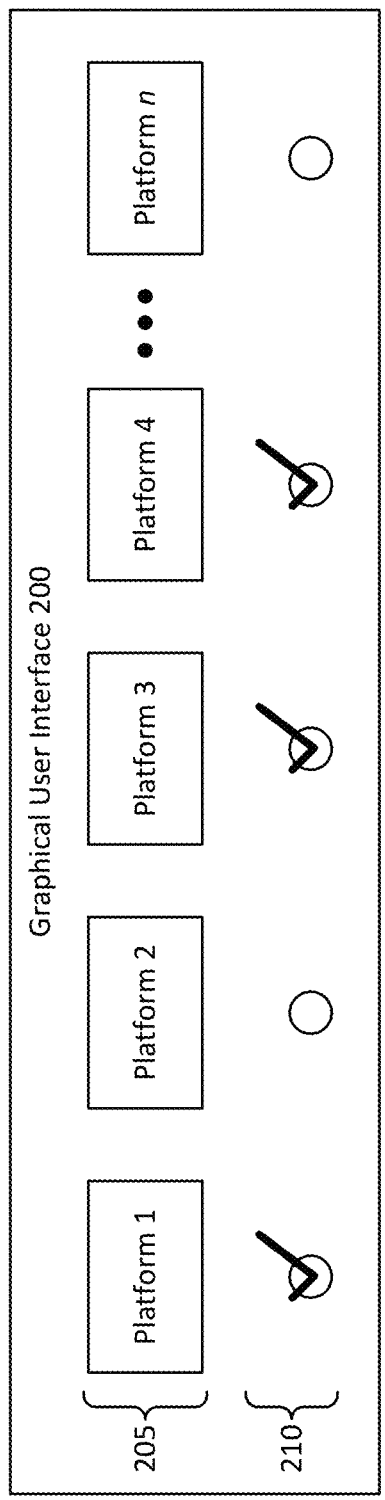
FIG. 2 illustrates a first example graphical user interface (GUI) that can be displayed in the system of FIG. 1, according to an illustrative implementation.

As part of the configuration process for the smart gallery, the user can tell the content analysis application 135 or the content analysis server 110 which social media platforms or software applications the user would like the system to work across. FIG. 2 illustrates a graphical user interface (GUI) 200 that can be provided by the content analysis application 135 or the content analysis server 110, for example via a display of the user computing device 105. The GUI 200 can allow the user to select any of a variety of platforms for the configuration process. As shown, the GUI 200 displays a list of n platforms 205. Beneath each of the platforms 205 is a respective selection element 210, which the user can select to indicate which platforms 205 should be included in the configuration process. For example, the platforms 205 may correspond to social media platforms such as Facebook or Snapchat. The platforms 205 may also correspond to other types of applications, including text messaging applications. In the example of FIG. 2, the user has selected Platform 1, Platform 3, and Platform 4 for inclusion in the configuration process. In some implementations, the user can make these selections using the input device 140, which may include a pointing device such as a mouse, a stylus, or a touchscreen interface. In some implementations, the calibration process can be performed automatically without input from the user. For example, the content analysis application 135 or the content analysis server 110 can determine a set of platforms to calibrate for the user without receiving input from the user via an interface such as the GUI 200. In some implementations, the content analysis application 135 or the content analysis server 110 can gather information from other sources, such as information stored on the user computing device 105, which may provide an indication about one or more platforms that are used by the particular user and to which the systems and methods disclosed herein should apply.

When the user selects the desired platforms 205 for the smart gallery to integrate with via the GUI 200, the content analysis application 135 or the content analysis server 110 can calibrate based on activity associated with those platforms for the purpose of analysis and for providing recommendations to the user. In this way, the system 100 can evaluate the content items 130 to be used in conjunction with at least one platform. In some implementations, the content analysis application 135 or the content analysis server 110 can provide an additional GUI to allow the user to enter credentials (e.g., a username and password) for each of the selected platforms 205, such that the content analysis application 135 or the content analysis server 110 can receive the user's information for the selected platforms. For example, if the user selects a platform 205 corresponding to Facebook, the content analysis application 135 or the content analysis server 110 can evaluate the content items 130 in order to make predictions for and maximize performance of the content items 130 among the user's Facebook friends. In some other implementations, when a user selects a platform, the content analysis application 135 or content analysis server 110 can use artificial intelligence to determine a "best fit" between the selected platform and any additional information the content analysis application 135 or content analysis server 110 has learned from other platforms in order to calibrate for the selected platform.

Recommended Platforms

When a user takes a new photo or video from the user computing device 105 (e.g., via an input device 140 corresponding to a camera) to generate a new content item 130, the content analysis application 135 or the content analysis server 110 can trigger a process to begin analysis of the content item 130. The analysis methods that are initiated can include analyzing the interplay of visual elements of the image file, and evaluating the content item 130 against the data that the content analysis application 135 or content analysis server 110 has acquired relating to the user's audience activity. Thus, the selected audience can become the analytical evaluation benchmark, which the content analysis application 135 or the content analysis server 110 can use for predicting visual preferences and visual engagement of the new content item 130.

Figure 3:
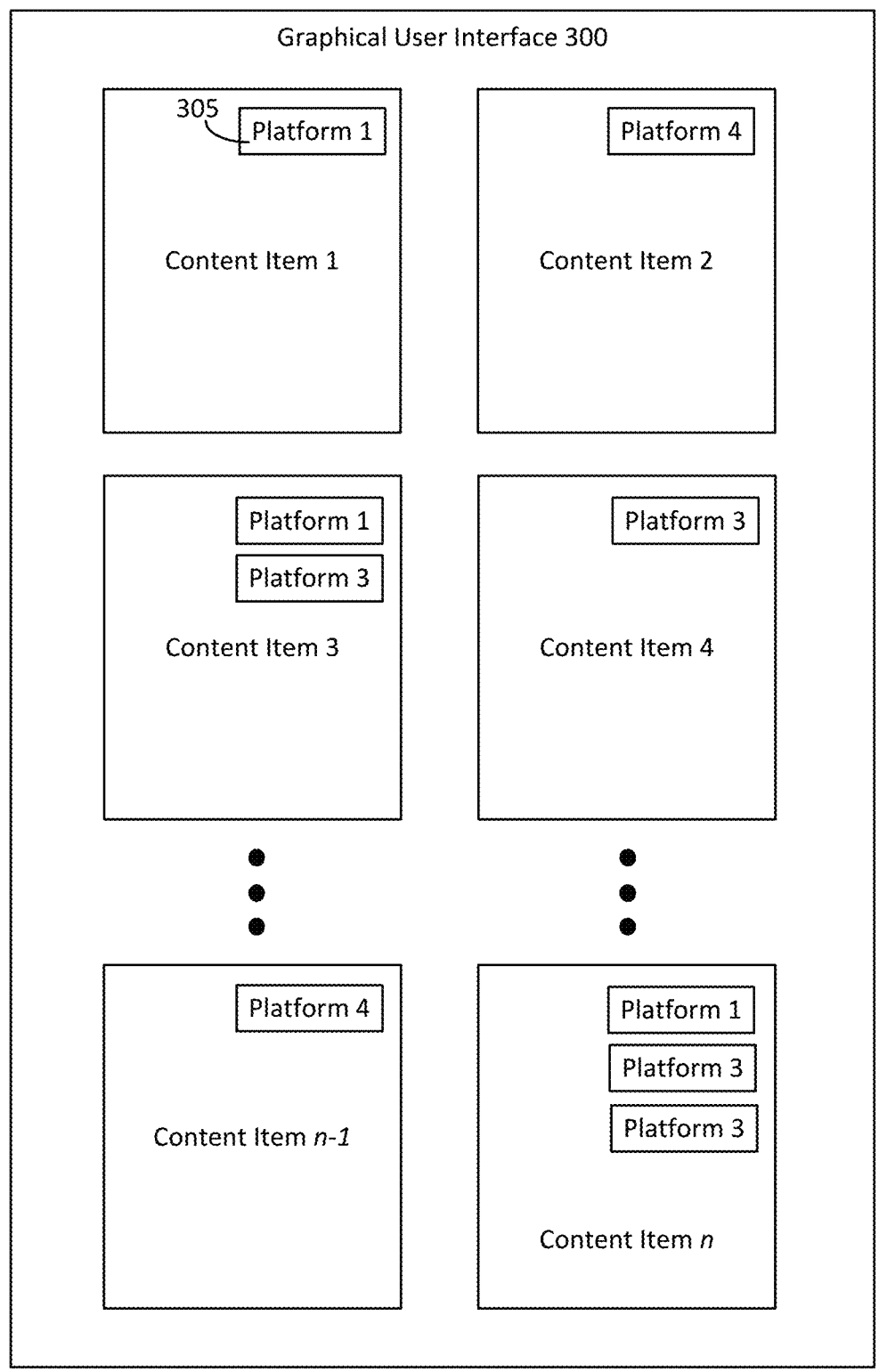
FIG. 3 illustrates a second example GUI that can be displayed in the system of FIG. 1, according to an illustrative implementation.

After the analysis of the new content item 130 has concluded, the content analysis application 135 or the content analysis server 110 can automatically tag the content item 130 with one or more advantaged platforms (platforms include social media networks, websites, application software, etc.). FIG. 3 illustrates a GUI 300 that shows a list of n content items 130, each of which includes one or more tags, such as the tag 305 shown for content item 1. As shown, the tags can appear overlaid on a portion of each content item that has been evaluated by the content analysis application 135 or the content analysis server 110, and each content item can include any number of tags. In some implementations, the content analysis application 135 or the content analysis server 110 can determine that a platform should be recommended for a particular content item based upon a predicted performance metric for the content item on that platform among user's audience. In an example, the performance metric may be an engagement metric, such as a number of likes, retweets, loves, shares, favorites, comments, or other interactions. The performance metric may also relate to a sales or business objective. This information provides the user with a recommendation for each content item 130 that has been evaluated, to inform the user of the platforms for which each content item 130 is best suited. In some implementations, the content analysis application 135 or the content analysis server 110 can generate these recommendations (i.e., tag each content item content item 130) in real-time as each new content item 130 is stored on the user computing device 105.

Recommended Content Items

Figure 4:
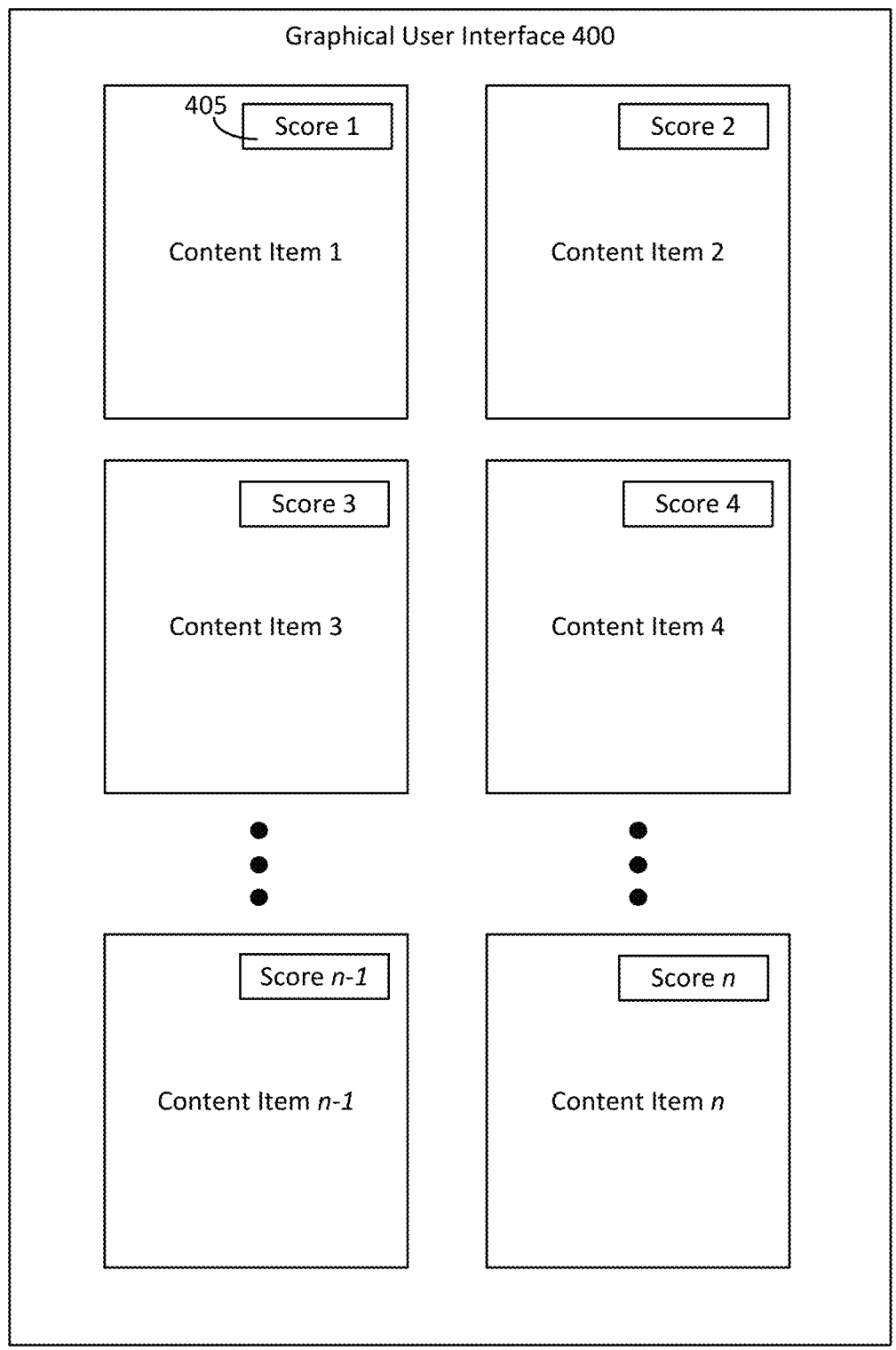
FIG. 4 illustrates a third example GUI that can be displayed in the system of FIG. 1, according to an illustrative implementation.

In some implementations, the content analysis application 135 or the content analysis server 110 can provide an interface through which the user may select one or more of the content items 130. The content analysis application 135 or the content analysis server 110 can then analyze visual elements of the set of selected content items 130 to calculate predicted performance scores for content item 130. FIG. 4 shows an example GUI 400 for providing these scores. The GUI 400 displays n content items 130, with each content item 130 including an associated score, such as the score 405 for content item 1. The scores can be displayed as an overlay for each content item 130. Each score can represent a predicted performance of each respective content item 130 for at least one target audience on at least one platform. In some implementations, each score may be an integer or decimal value. For example, the scores may range from zero to 100, with higher scores indicating greater predicted performance. This feature can enable the user to determine which content item 130 to use for a particular purpose (e.g., a new post to be shared via one of the content publishers 120) from a subset of the content items 130. In some implementations, the content analysis application 135 or the content analysis server 110 may also provide a score in terms of the percentage increase of engagement one content item 130 is predicted to achieve relative to another content item 130 (e.g. 10% more loves).

In some implementations, the content analysis application 135 or the content analysis server 110 may recommend content items to the user which are not currently included in the set of content items 130 stored on the user computing device 105. For example, the content analysis application 135 or the content analysis server 110 can be configured to retrieve a relevant content item from any of the content sources 115 shown in FIG. 1, which may correspond to content libraries, image databases, etc. for the purpose of sharing or use by the user. In such an example, the content analysis application 135 or the content analysis server 110 can analyze a set of available content items accessible via the content sources 115 that are relevant to a topic or subject matter specified by the user of the user computing device 105. The content analysis application 135 or the content analysis server 110 can then score the content items in a manner similar to that described above to determine their predicted performance, and can return the top performers to the user for view. For example, the user may begin composing a post about a puppy to be published via one of the content publishers 120. The content analysis application 135 or the content analysis server 110 may then recommend images of puppies retrieved from the content sources 115 that have high predicted performance (i.e., high scores) for at least one of the user's audiences. In some implementations, the content analysis application 135 or the content analysis server 110 may rank the content items based in part on recency or other criteria that may be helpful in the user's decision-making process. In another example, the user may select a content item 130 stored on the user computing device 105, and the content analysis application 135 or the content analysis server 110 can be configured to respond by retrieving similar content items from the content sources 115 that may have higher predicted performance (e.g., higher scores) among one or more target audiences.

Recommended Transformations

Figure 5:
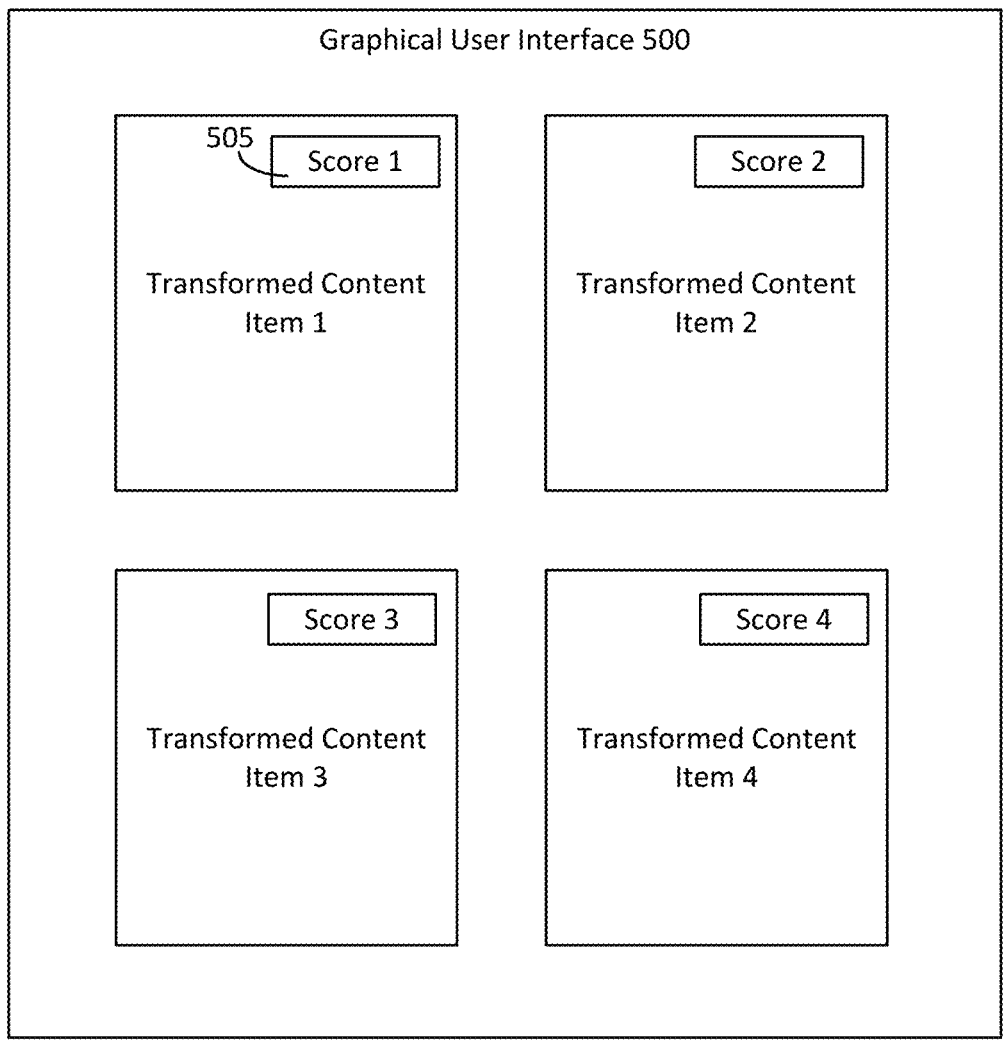
FIG. 5 illustrates a fourth example GUI that can be displayed in the system of FIG. 1, according to an illustrative implementation.

In some implementations, the content analysis application 135 or the content analysis server 110 can provide a set of recommended transformations to apply to a content item 130. A recommended transformation can be any adjustment, modification, or "filters" to apply to a content item 130 that changes an aspect of its visual appearance in order to maximize or improve the performance of the content item 130 on a particular platform or for a particular audience. FIG. 5 illustrates an example GUI 500 for providing recommended transformations. In some implementations, the user may select a particular content item 130 from among the set of content items 130 stored on the user computing device 105. The content analysis application 135 or the content analysis server 110 can then cause the GUI 500 to be displayed. The GUI 500 includes four transformed content items, each of which includes a respective score, such as the score 505. Each of the transformed content items can be based on the particular content item 130 selected by the user for analysis. The content analysis application 135 or the content analysis server 110 can generate each transformed content item by modifying any aspect of the visual appearance of the content item 130.

Generally, the content analysis application 135 or the content analysis server 110 can select transformations that result in increased scores for the transformed content items, relative to the score of the selected (untransformed) content item 130. The user can therefore determine, based on the respective scores for the transformed content items, how each recommended transformation will affect the score (and predicted performance) of the content item 130. The set of transformed content items can be shown in the GUI 500 alongside each other, so that the user can see how the transformations would alter the image before the user makes a decision, such as choosing to publish one of the transformed content items. It should be understand that, while four transformed content items are shown in FIG. 5 for illustrative purposes, in some other implementations, the content analysis application 135 or the content analysis server 110 can produce and display any number of transformed content items (and their respective scores) for a given content item 130. In some implementations, a recommended transformation may be an Instagram filter option. After the transformed content items have been displayed to the user via the GUI 500, the user may then have the ability to select one or more of the transformed content items to be shared (e.g., published by any of the content publishers 120). The transformed content items may also be stored on the user computing device 105 (e.g., as new content items 130), or electronically distributed in other ways via the user computing device 105.

Historical Top-Performer Content Items

Figure 6:
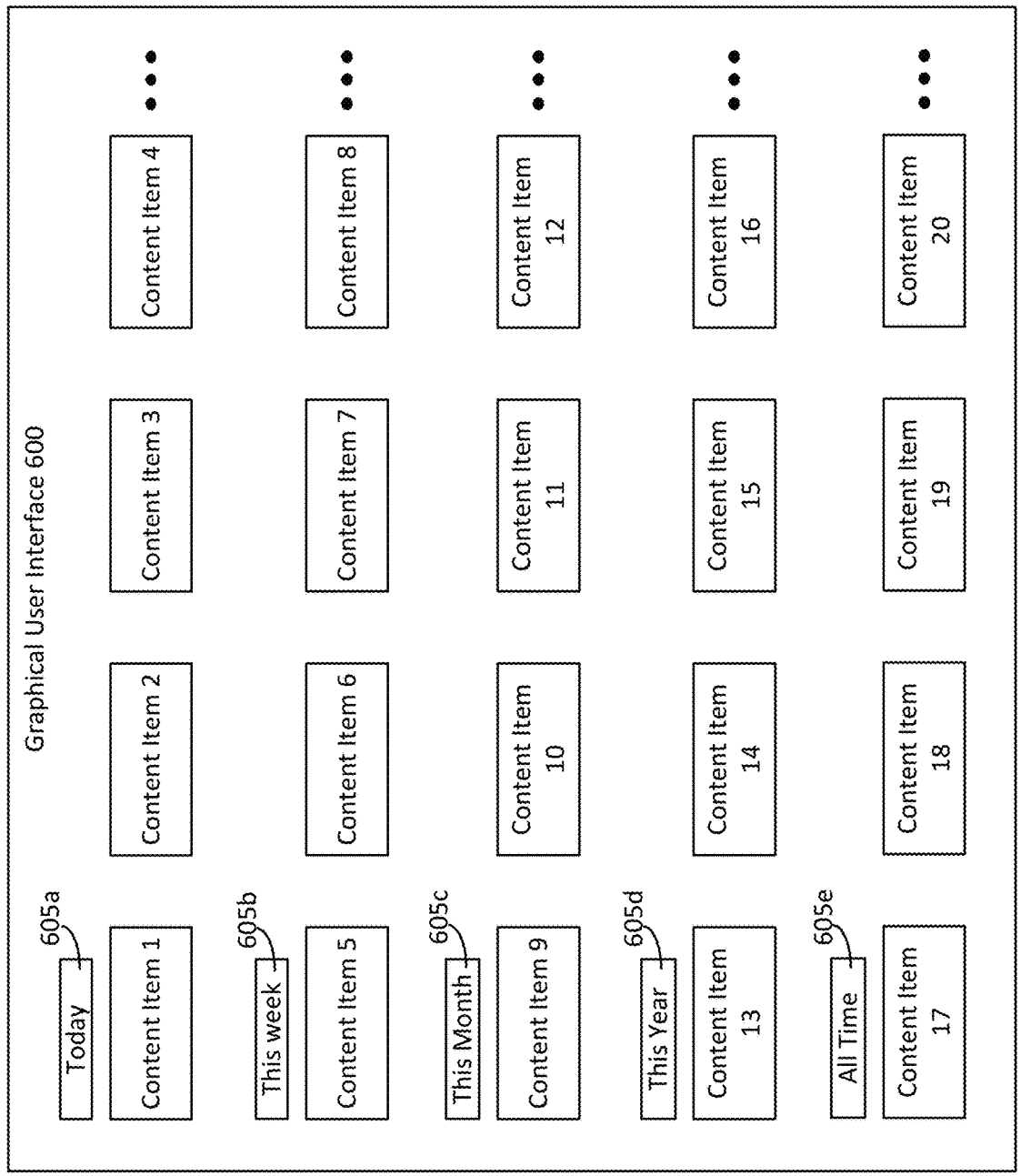
FIG. 6 illustrates a fifth example GUI that can be displayed in the system of FIG. 1, according to an illustrative implementation.

In some implementations, the content analysis application 135 or the content analysis server 110 can generate a historical view of the user's content items 130 that are ranked based on their appeal for various time periods. For example, the content items 130 can be ranked and displayed in order by day, week, month, all-time, etc. FIG. 6 illustrates a GUI 600 for displaying such information. As shown, the GUI 600 shows a variety of time periods 605*a*-605*e* (generally referred to as time periods 605). For each time period 605, the GUI shows a list of top-ranked content items 130 for that time period. In some implementations, a content item 130 can be eligible for display only under the time periods during which content item 130 was generated and/or first stored on the user computing device 105. It should be understood that, while the GUI 600 shows a different list of content items for each time period 605, in some implementations a content item may appear in more the list for more than one of the time periods 605. For example, content item 1 may appear in the lists for the time periods 605 corresponding to today, this week, and this month, provided that the content analysis application 135 or the content analysis server 110 determines that content item 1 is in fact among the top scoring content items 130 for all of those respective time periods 605.

In some implementations, the user may be able to select a time period or other criteria to be used by the content analysis application 135 or the content analysis server 110 to generate a list of content items 130 that are highest ranking for that criteria. For example, the user may be able to request the highest ranking content item 130 from an arbitrary time period, such as October 2016, or the highest ranking content item 130 that includes specified subject matter, such as an image of the user's pet. In another example, the user may be able to request the highest ranking content item in which the user himself or herself is featured (e.g. a "selfie"). In some implementations, the content analysis application 135 or the content analysis server 110 can select the highest ranking images to be displayed across one or more particular audiences. For example, the audiences may be the user's own audience (e.g., as determined by the content analysis application 135 or the content analysis server 110 in the configuration phase described above). In some other implementations, the audience may be a "global" audience. Thus, the content analysis application 135 or the content analysis server 110 can help to identify the most generally and broadly appealing content items 130 stored on the user computing device 105. This feature can be useful for recommending memories and "throwback" content items 130 that the user may wish to share via the content publishers 120.

User Identity Evaluation

Figure 7:
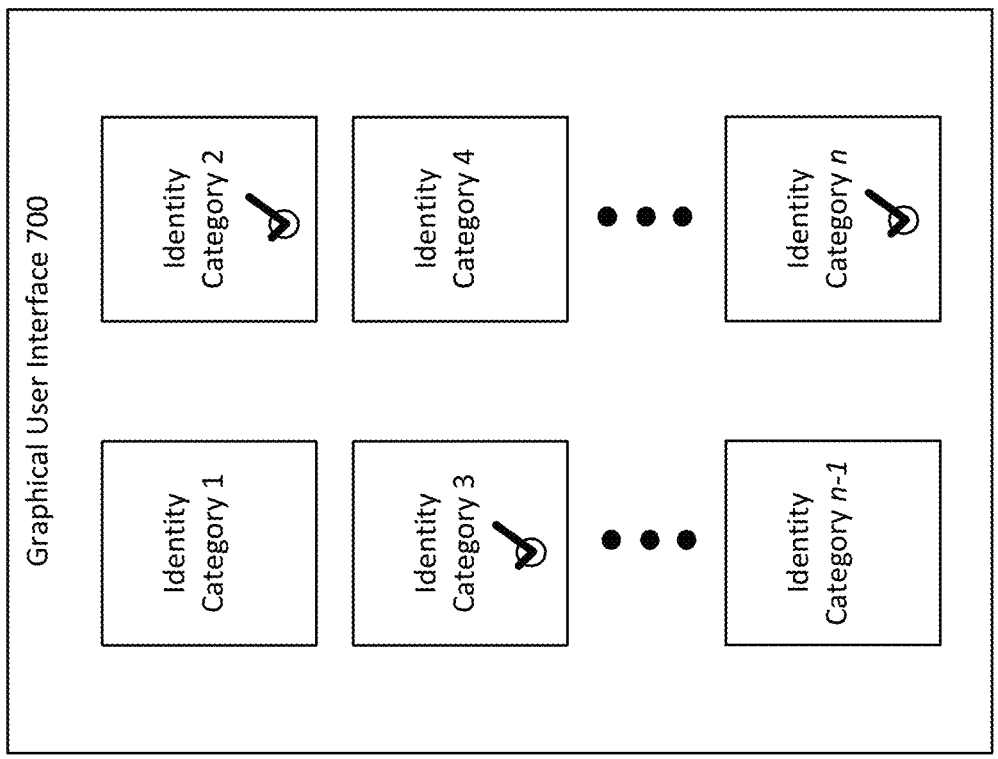
FIG. 7 illustrates a sixth example GUI that can be displayed in the system of FIG. 1, according to an illustrative implementation.
Figure 8:
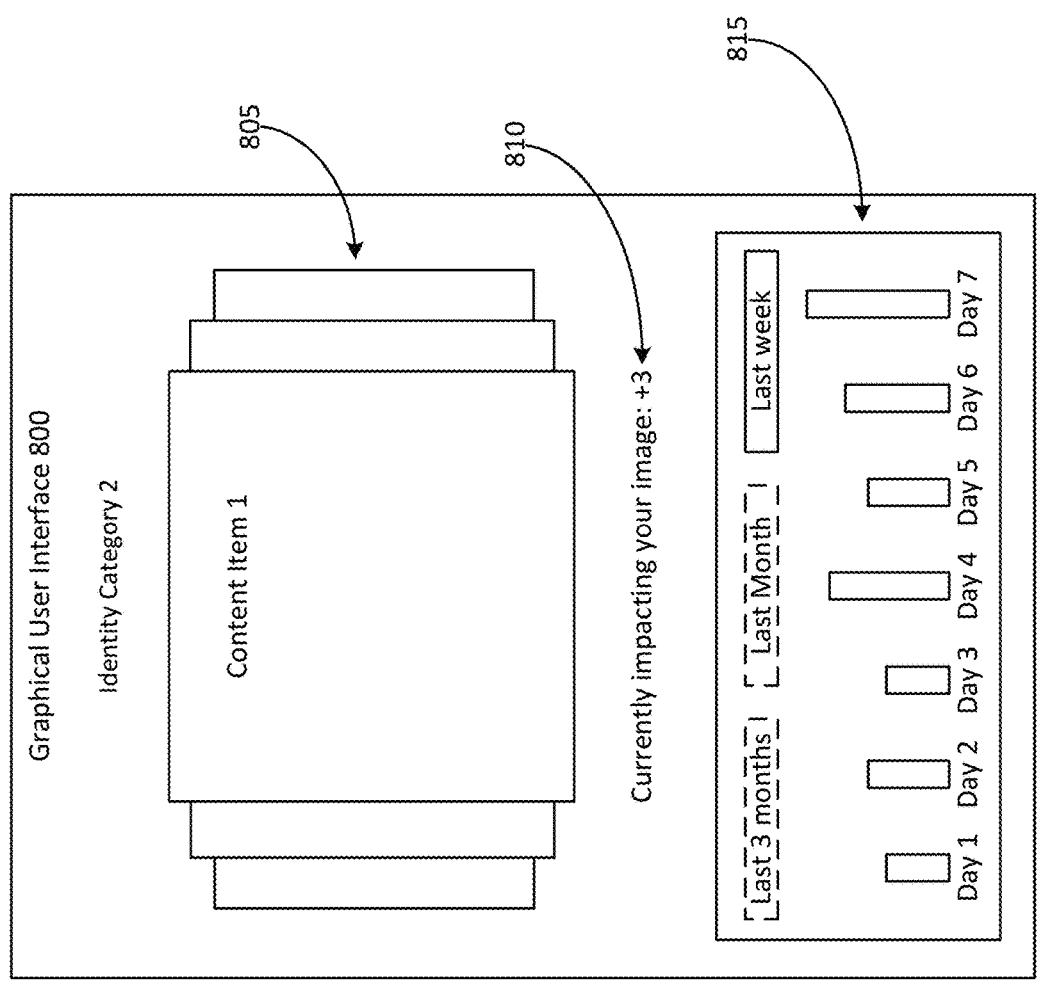
FIG. 8 illustrates a seventh example GUI that can be displayed in the system of FIG. 1, according to an illustrative implementation.

In some implementations, the content analysis application 135 or the content analysis server 110 can help a user to select a subset of content items 130 for publication in order to improve the user's image or identity. In this context, the terms "image" or "identity" can refer to any aspects of how the user is perceived by members of a particular audience. For example, the audience may be any group of people having a common interest, or the audience may include the user's family or friends. As a result, there may be a plurality of identity categories that may be of interest to a user. FIGS. 7 and 8 show example GUIs for allowing a user to manage one or more of the user's identities. In particular, FIG. 7 illustrates a GUI 700 that provides a list of n potential identity categories. Identity categories can also be referred to as "image categories" in this disclosure. The identity categories can relate to any interest of the user or persona that the user would like to project. For example, the identity categories may relate to activities that the user participates in, products that the user is interested in, hobbies that the user engages in. Each identity category can be labeled with a word or phrase related to the identity category, such as "car aficionado," "wine enthusiast," "pet lover," "athlete," "fashionista," "outdoorsy," etc. The identity categories can be selectable elements of the GUI 700. In some implementations, the user may select any of the identity categories that are of interest to the user, for example via the input device 140 of the user computing device 105. In the example of FIG. 7, the user has selected identity categories 2, 3, and n, while identity categories 1, 4, and n−1 remain unselected.

For each identity category that the user selects, the content analysis application 135 or the content analysis server 110 can be configured to provide feedback to the user indicating how each of the content items 130 stored on the user computing device 105 impacts the user's image or identity in that category. For example, the impact that a content item 130 has on an identity category can be or can be based on any metric representing a predicted performance of each respective content item 130 for a given identity category (e.g., based on predicted performance of the content item with an audience associated with that identity category). FIG. 8 shows a GUI 800 for displaying this information to the user. In some implementations, the GUI 800 can be generated when the user selects identity category 2 from the GUI 700 shown in FIG. 7. The GUI 800 presents a scrollable list of content items 130. In the example of FIG. 8, content item 1 is selected. The GUI 800 also displays a score 810 for the selected content item. For example, the score 810 can be an integer, with a negative value indicating that the selected content item reduces the user's identity for this identity category and a positive value indicating that the selected content item improves the user's identity for this identity category.

The GUI 800 also shows historical data 815, which may display information related to the historical impact that the selected content item had on the user's identity during a past time period. In the example of FIG. 8, the historical data 815 displays a bar to visually indicate how the selected content item impacted the user's identity on each day of the previous week. For example, the length of each bar can be proportional to the magnitude of the impact that the selected content item had on a particular day. Other time periods can also be selected within the historical data 815, including the last month or the last three months. Thus, via the GUI 800, the user can determine whether a selected content item improves or reduces the user's identity in a particular identity category. In some examples, the user may choose to delete (or avoid publishing) content items that reduce the user's identity for a given identity category.

Figure 9:
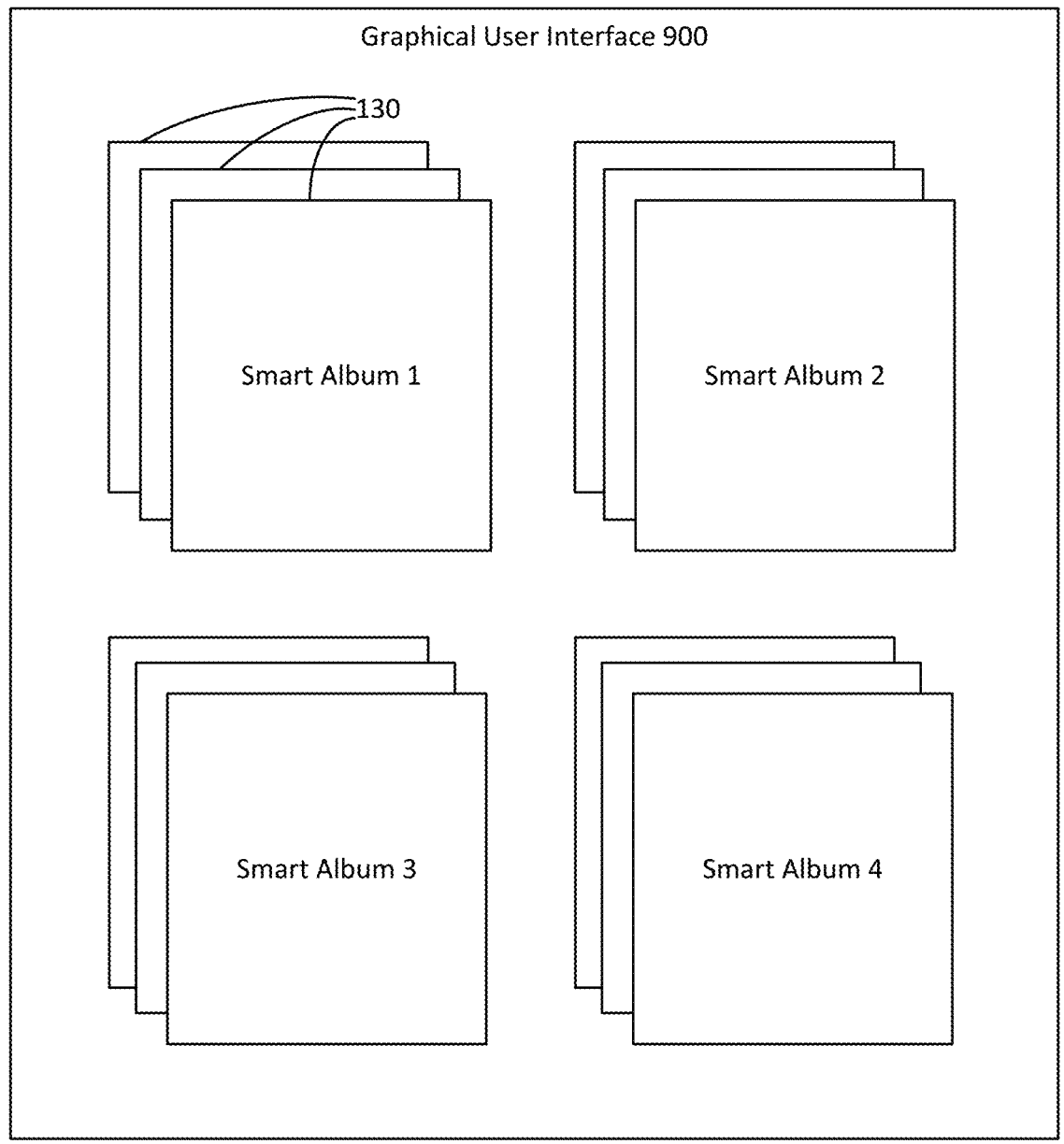
FIG. 9 illustrates a eighth example GUI that can be displayed in the system of FIG. 1, according to an illustrative implementation.

FIG. 9 shows a GUI 900 that presents a variety of smart albums for display to the user. A smart album can include a group of content items 130 that are related to one another in some way. For example, the content analysis application 135 or the content analysis server 110 can be configured to determine one or more sets of content items 130 that share a common characteristic, and can automatically group those content items together into a smart album. In some implementations, the content analysis application 135 or the content analysis server 110 can determine a set of related content items 130 based on a visual feature shared by the content items 130. For example, a group of content items 130 that each include a visual feature corresponding to an identity of the user's pet may be combined to form a smart album directed to the user's pet. In some other example, the content analysis application 135 or the content analysis server 110 can determine that a set of content items 130 is related based on other characteristics, such as location data included in the metadata of each content item 130.

In some implementations, a user may be able to cause the content analysis application 135 or the content analysis server 110 to automatically create a smart album. For example, the user may enter search criteria (e.g., a text string), and the content analysis application 135 or the content analysis server 110 can automatically compile content items 130 that relate to the search criteria into a new smart album. In some implementations, the user may provide an input corresponding to an audio signal (e.g., a voice input), and the content analysis application 135 or the content analysis server 110 can parse the audio signal to determine a content item characteristic. The content analysis application 135 or the content analysis server 110 can then automatically compile content items 130 that relate to or include the determined content item characteristic. In other examples, the user may user a different type of gesture or interaction (e.g., via the input device 140) to cause the content analysis application 135 or the content analysis server 110 to create a smart album. For example, while viewing one or more content items 130 on the user computing device 105, the user may perform a "summon" interaction that may include a long press, a hold, a hover gesture, a click, or any other type of selection gesture relating to the content items 130 that are being viewed. In response to the summon gesture, the content analysis application 135 or the content analysis server 110 can automatically identify a subset of the content items 130 stored on the user computing device 105 that are visually similar to the content items 130 on which the summon gesture was performed. The content analysis application 135 or the content analysis server 110 can create a smart album using the identified content items 130, which can be presented to the user, for example via the GUI 900.

The user can then view the content items 130 in that smart album. For example, this feature can allow the user to easily find content items 130 having particular visual features, captured in a particular location, relating to a particular interest, etc. Thus, the user can use this feature to easily identify content items 130 that may be duplicates of (or similar to) other content items 130 stored on the user computing device 105. The user can also use this feature to identify the best content items 130 related to a particular location, relating to a particular interest, etc., so that the user may select the best content items 130 for publishing. In some implementations, the content analysis application 135 or the content analysis server 110 can also provide a score for each content item 130 included in the smart album. For example, the score for each content item 130 can be presented as an overlay over the respective content item 130.

Figure 10:
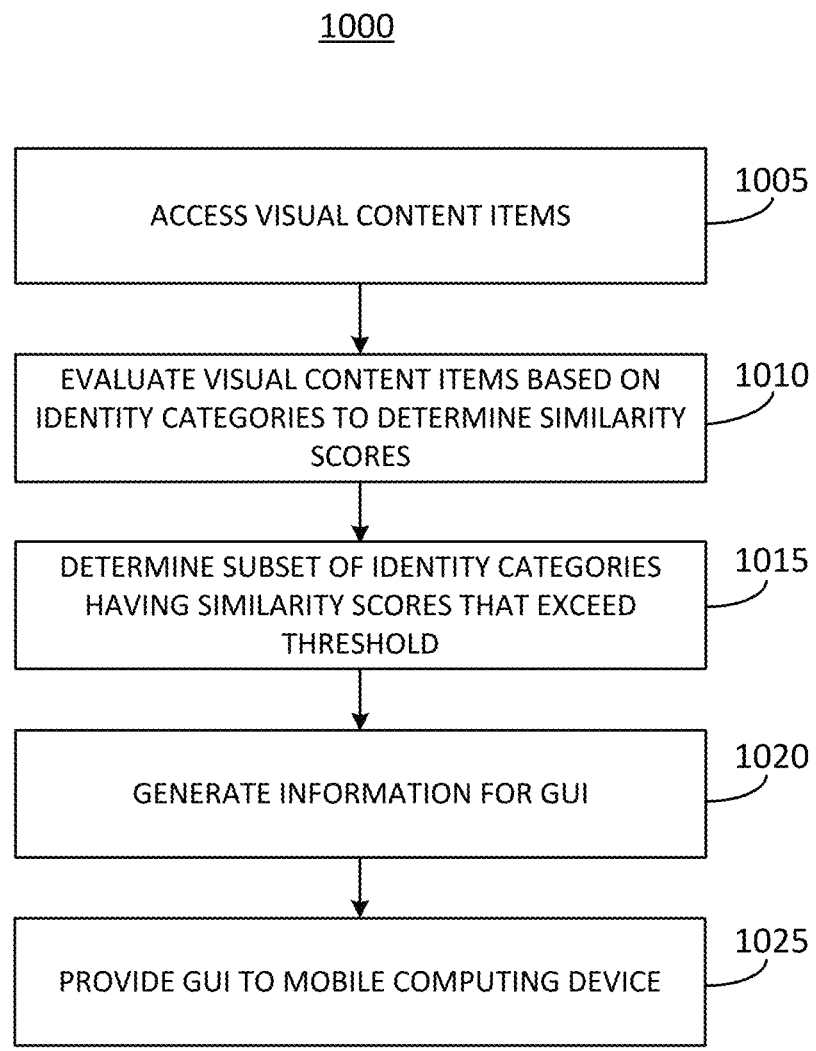
FIG. 10 illustrates a flowchart of an example method for analyzing content items, according to an illustrative implementation.

FIG. 10 illustrates a method 1000 for analyzing visual content items, in accordance with one or more implementations. The operations of method 1000 presented below are intended to be illustrative. In some implementations, method 1000 may be accomplished with one or more additional operations not described, and/or without one or more of the operations discussed. Additionally, the order in which the operations of method 1000 are illustrated in FIG. 10 and described below is not intended to be limiting.

In some implementations, method 1000 may be implemented in one or more processing devices (e.g., a digital processor, an analog processor, a digital circuit designed to process information, an analog circuit designed to process information, a state machine, and/or other mechanisms for electronically processing information), such as the content analysis server 110 of FIG. 1. The one or more processing devices may include one or more devices executing some or all of the operations of method 1000 in response to instructions stored electronically on an electronic storage medium. The one or more processing devices may include one or more devices configured through hardware, firmware, and/or software to be specifically designed for execution of one or more of the operations of method 1000. In some implementations, the one or more processing devices may be distributed across two or more computing systems. For example, in some implementations at least some of the operations of the method 1000 may be performed by the content analysis server 110, while other operations of the method 1000 may be performed by the user computing device 105 shown in FIG. 1. In addition, functionality described as being performed by one device may in some implementations be performed instead by another device within the system 100 of FIG. 1. The method 1000 is described below with reference to the system 100 of FIG. 1.

Referring now to FIG. 10, an operation 1005 can include accessing a plurality of visual content items. In some implementations, the visual content items can be or can include any of the content items 130 described in connection with FIG. 1. For example, the plurality of visual content items can be digital photos or videos. The visual content items can be accessed from a mobile computing device such as the user computing device 105. In some implementations, the visual content items can be accessed from the mobile computing device by a remote computing device such as the content analysis server 110, for example via a computer network such as the Internet. The plurality of visual content items can be content items that have been captured by the mobile computing device. For example, the mobile computing device may include a camera to capture images or videos, which may be stored in a memory element of the mobile computing device.

An operation 1010 can include evaluating the plurality of visual content items based on a plurality of identity categories to determine similarity scores. In this context, the term "identity" can refer to any aspects of how the user is perceived by others based on the visual content items stored on the user's mobile computing device, and "identity categories" may refer to any interest of the user or persona that the user would like to project. For example, the identity categories may relate to activities that the user participates in, products that the user is interested in, hobbies that the user engages in, etc. In some implementations, evaluating the plurality of visual content items can include determining a respective similarity score between the plurality of visual content items and each of the plurality of identity categories. For example, each identity category can be represented as one or more mathematical models, such as a generative model, based on features extracted from a set of training content items that are known to be associated with that identity category. In some implementations, the training content items for each identity category can be content items previously published by other users. For example, the training content items may be published on a website hosted by one or more of the content publishers shown in FIG. 1, or may be retrieved from the content sources 115.

In some implementations, evaluating the plurality of visual content items can include applying at least one of a statistical technique or a machine learning model to the plurality of visual content items for each of the plurality of identity categories. For example, for a given identity category, the content analysis server 110 can be configured to compare the plurality of visual content items to the one or more models representing the identity category to determine a similarity score between the plurality of visual content items and the identity category. The similarity score can represent a degree of similarity between the plurality of visual content items and the model representing the identity category. In some implementations, the content analysis server 110 can repeat this process for each identity category to determine respective similarity scores representing degrees of similarity between the plurality of visual content items and each identity category. In some implementations, there may be at least 5 identity categories, at least 10 identity categories, at least 20 identity categories, at least 30 identity categories, at least 40 identity categories, or at least 50 identity categories, at least 100 identity categories.

In some implementations, the evaluation of the plurality of visual content items to determine the respective similarity score between the plurality of visual content items and a particular identity category can be based at least in part on a percentage of the plurality of visual content items that correspond to that identity category. The evaluation for a particular identity category can also be based at least in part on a quality rating of at least one of the plurality of visual content items that corresponds to that identity category.

An operation 1015 can include determining a subset of the identity categories for which the respective similarity scores exceed a similarity threshold. For example, in some implementations, each similarity score can be a numerical value, with higher values indicating a higher degree of similarity. Thus, the subset of identity categories for which the respective similarity scores exceed the similarity threshold can include the identity categories that are most similar to the plurality of visual content items accessed from the mobile computing device. In some implementations, instead of determining a subset of the identity categories for which the respective similarity scores exceed a similarity threshold, the content analysis server 110 can identify a subset of identity categories including a predetermined number of the identity categories having the highest similarity scores. For example, the content analysis server 110 can identify the five identity categories having the highest similarity scores, without regard for whether the similarity scores exceed any predetermined similarity threshold. The content analysis server can identify a subset of identity categories including any number of identity categories in this manner.

An operation 1020 can include generating information corresponding to a GUI. In some implementations, the GUI can include a visual representation of each identity category of the subset of identity categories and a user-selectable interface element for each identity category of the subset of identity categories. In some implementations, the visual representation of each identity category can include a photo that represents each identity category. In some implementations, the user-selectable interface element for each identity category can include a check box or a radio button. For example, the GUI can correspond to the GUI 700 shown in FIG. 7.

An operation 1025 can include providing the information corresponding to the GUI to the mobile computing device. In some implementations, providing the information corresponding to the GUI can cause the mobile computing device to render the GUI via an electronic display of the mobile device.

Figure 11:
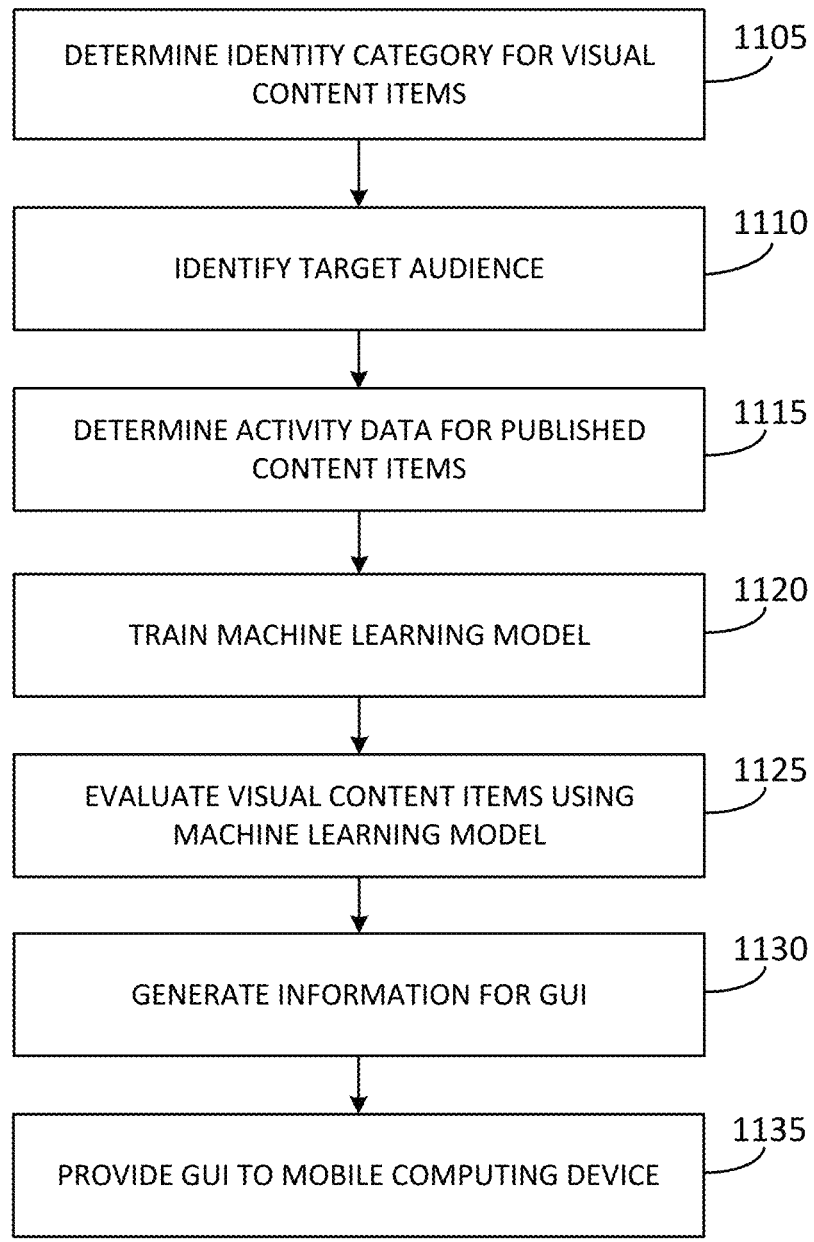
FIG. 11 illustrates a flowchart of an example method for analyzing content items, according to an illustrative implementation.

FIG. 11 illustrates a method 1100 for analyzing visual content items, in accordance with one or more implementations. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in one or more processing devices (e.g., a digital processor, an analog processor, a digital circuit designed to process information, an analog circuit designed to process information, a state machine, and/or other mechanisms for electronically processing information), such as the content analysis server 110 of FIG. 1. The one or more processing devices may include one or more devices executing some or all of the operations of method 1100 in response to instructions stored electronically on an electronic storage medium. The one or more processing devices may include one or more devices configured through hardware, firmware, and/or software to be specifically designed for execution of one or more of the operations of method 1100. In some implementations, the one or more processing devices may be distributed across two or more computing systems. For example, in some implementations at least some of the operations of the method 1100 may be performed by the content analysis server 110, while other operations of the method 1100 may be performed by the user computing device 105 shown in FIG. 1. In addition, functionality described as being performed by one device may in some implementations be performed instead by another device within the system 100 of FIG. 1. The method 1100 is described below with reference to the system 100 of FIG. 1.

Referring now to FIG. 11, an operation 1105 can include determining an identity category for a plurality of visual content items. In some implementations, the visual content items can be accessed from a mobile computing device. In some implementations, the visual content items can be or can include any of the content items 130 described in connection with FIG. 1. For example, the plurality of visual content items can be digital photos or videos. The visual content items can be accessed from a mobile computing device such as the user computing device 105. In some implementations, the visual content items can be accessed from the mobile computing device by a remote computing device such as the content analysis server 110, for example via a computer network such as the Internet. The content analysis server can also determine the identity category for the plurality of visual content items. In this context, the term "identity" can refer to any aspects of how the user is perceived by others based on the visual content items stored on the user's mobile computing device, and "identity categories" may refer to any interest of the user or persona that the user would like to project. For example, the identity categories may relate to activities that the user participates in, products that the user is interested in, hobbies that the user engages in, etc.

In some implementations, the method 1100 can be performed independently from the method 1000 shown in FIG. 10. However, in some implementations the operations of the method 1100 may follow the operations of the method 1000. For example, the operation 1105 of the method 1100 can be performed based on a user input corresponding to the GUI provided to the mobile computing device in operation 1025 of the method 1000. Thus, in some implementations, a user may provide a user input corresponding to a selection of the of the subset of identity categories included in the GUI provided in the method 1000, for example via the corresponding selectable interface element. Operation 1105 of the method 1100 can include identifying the identity category based on the input received from the mobile computing device.

An operation 1110 can include identifying a target audience. The target audience can refer to an audience of a user of the mobile computing device. For example, the target audience can include any other user or group of users who may view content items published by the user of the mobile computing device. The target audience may be defined by a set of characteristics or demographic traits shared by members of the target audience. In some implementations, the target audience can be defined by particular members of the target audience. In some implementations, the content analysis server 110 can receive input from the user, explicitly informing content analysis server 110 of the user's target audience. For example, the method 1100 can further include providing information corresponding to GUI to the mobile computing device. The GUI can include a list of a plurality of candidate audiences, and a user of the mobile computing device can make a selection of one or more of the candidate audiences. The target audience can be identified based on the user's selection.

In another example, the content analysis server 110 can determine an audience by accessing a social media account of the user and identifying other accounts that are linked with the user's account (e.g., followers or other users connected to the user through the social media account). In another example, the content analysis application 135 or the content analysis server 110 can analyze the content items 130 stored on the user computing device 105 in order to match an audience that fits the user's visual content items and preferences. In some implementations, the method 1100 can include determining a category of at least a portion of the plurality of visual content items. For example, a category can be or can relate to a subject matter or type of the visual content items. The target audience can be determined based on the determined category. For example, the target audience can be an audience that is likely to engage with visual content items of the determined category. One or more artificial intelligence models may be used in discovering the most accurate match of an audience for the user.

An operation 1115 can include determining activity data for published content items. In some implementations, the published content items can be retrieved from at least one content source, which may correspond to one or more of the content sources 115 or the content publishers 120 shown in FIG. 1. For example, the content analysis server 110 can access at least one content source via a computer network (e.g., the Internet) to retrieve content items that have already been published or otherwise made available to the content analysis server 110. In some implementations, some of the published content items may be content items that were published by the user of the mobile computing device. However, the published content items retrieved in operation 1115 need to be content items captured or published by the user of the mobile computing device. For example, the published content items may include content items published by other users, who may or may not be members of the target audience identified in operation 1110. In some implementations, the published content items can be selected based on the at least one identity category determined in operation 1105. For example, the published content items can be content items known to be closely associated with the at least one identity category. In some implementations, the activity data can relate to engagement of viewers with the plurality of published content items. For example, activity data for a published content item can include metrics such as a number of other users who viewed the published content item, a number of other users who "liked" the published content item, a number of other users who commented on the published content item, a sentiment expressed in comments relating to the published content item, and the like. In some implementations, the activity data can relate to engagement of members of the target audience with the plurality of published content items. In some implementations, the activity data can relate to engagement of viewers who are not members of the target audience with the plurality of published content items.

In some implementations, the method 1100 can also include identifying a target content platform. The target content platform can include a website, a software application, or any other medium to which the user may publish or post a content item and via which the target audience may view or interact with the content item. For example, the target content platform can include a social media website or application, a dating application or website, or a professional networking application or website. In some implementations, the target content platform can correspond a software application or website hosted by one of the content publishers 120 shown in FIG. 1. In some implementations, the content analysis server 110 can receive input from the user, explicitly informing content analysis server 110 of the target content platform. In another example, the content analysis server 110 can determine the target content platform by analyzing the content items 130 stored on the user computing device 105 in order to identify a target content platform on which the user's visual content items are likely to perform well among the target audience, relative to another target platform. In some implementations, the content analysis server 110 can also select the content source from which the published content items are accessed in operation 115 to correspond to the identified target content platform.

An operation 1120 can include training a machine learning model. In some implementations, the machine learning model can be trained based on the published content items and the activity data determined in operation 1115. For example, in some implementations the published content items and the activity data can be included in training data used to train the machine learning model. In some implementations, the training data used to train the machine learning model can be based at least in part on the activity data and the published content items. For example, the training data may not include the published content items themselves, but may include one or more features extracted from image data corresponding to the one or more published content items. In some implementations, the machine learning model can be trained based in part on the target audience. The machine learning model can be trained to determine a predicted performance score for a content item. In some implementations, the predicted performance score can correspond to a prediction of how the visual content item is likely to perform among the target audience. For example, a predicted performance score can be an integer from 1 to 100, with higher values indicating better predicted performance. In some implementations, the machine learning model may include one or more of an artificial neural network, a computer vision se other data analysis techniques.

An operation 1125 can include evaluating each visual content item of the plurality of visual content items accessed from the mobile computing device using the machine learning model that was trained in operation 1120. For example, evaluating a visual content item can include introduce the visual content item (or information generated based on the visual content item, such as one or more features extracted from or generated using the visual content item) into the machine learning model to cause the machine learning model to produce an output. The machine learning model may generate an output corresponding to a respective predicted performance score for each visual content item of the plurality of visual content items.

An operation 1130 can include generating information corresponding to a GUI. In some implementations, the GUI can include a visual representation of at least a subset of the plurality of visual content items, as well as the respective predicted performance scores for the subset of the plurality of visual content items. For example, the visual representation of each visual content item included in the GUI can be a thumbnail image corresponding to each visual content item. In some implementations, the GUI can be or can include any of the GUIs described above in connection with FIGS. 2-9. For example, the GUI can include the visual representations of the subset of the visual content items arranged in a rectangular array. In some implementations, the respective predicted performance scores can overlap at least a portion of the visual representations of their respective visual content items within the GUI.

In some implementations, the method 1100 can include receiving, from the mobile computing device, a user input specifying a time period. The subset of visual content items included in the GUI can be selected based on the time period. For example, each visual content item presented within the GUI can have a timestamp (e.g., metadata indicating a time at which each visual content item was captured or generated by the mobile computing device) that falls within the identified time period. Thus, visual content items having timestamps outside of the time period may be excluded from the GUI.

In some implementations, the method 1100 can include identifying a target content item characteristic. Each visual content item of the plurality of visual content items can be evaluated to determine whether the visual content item includes the target content item characteristics, and the subset visual content items included in the GUI can be selected such that each visual content item in the GUI includes the target content item characteristic. In some implementations, a target content item characteristic can be or can include one or more features of a scene depicted in a visual content item, one or more features of objects depicted in a visual content item, a color or colors most prevalent in a visual content item, a subject matter of a visual content item, etc. The target content item characteristic can be based on a user input. For example, in some implementations a user input corresponding to a search criteria text string can be received from the mobile computing device, and the search criteria text string can be parsed to identify the target content item characteristic. In some implementations, the user input can correspond to an audio signal, and the audio signal can be parsed to identify the target content item characteristic.

An operation 1135 can include providing the information corresponding to the GUI to the mobile computing device. In some implementations, providing the information corresponding to the GUI can cause the mobile computing device to render the GUI via an electronic display of the mobile device.

In some implementations, operations of the method 1100 can be repeated one or more times. For example, the method 1100 can include automatically detecting that a new visual content item has been captured by the mobile computing device. In some implementations, the detection can be made by the mobile computing device itself (e.g., the user computing device 105, or a component thereof such as the content analysis application 135). In some implementations, the detection can be made by thee content analysis server 110, for example based on information received from the content analysis application 135 to indicate that a enw visual content item has been captured by the user computing device 105. The new visual content item may not be included in the plurality of visual content items analyzed the first time the operations of the method 1100 are performed. In some implementations, the method 1100 can include automatically evaluating the new visual content item using the machine learning model based on the published content items and the activity data to generate a respective predicted performance score for the new visual content item, responsive to detecting that the new visual content item has been capture by the mobile computing device.

In some implementations, operations similar to those described above can also be performed to evaluate content items not included on the user's mobile computing device. For example, the method 1100 can include accessing a new visual content item from a content source remote from the mobile computing device. The content source may include any of the content publishers 120 shown in FIG. 1. In some implementations, new visual content item can be evaluated using the machine learning model based on the published content items and the activity data to generate a respective predicted performance score for the new visual content item. In some implementations, if the predicted performance score for the new visual content item exceeds a predetermined threshold, the method 1100 can also include providing the new visual content item to the mobile computing device. For example, the new visual content item can be provided to the mobile computing device along with an alert or notification corresponding to a recommendation for the user of the mobile computing device to publish the new visual content item.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

As used herein, the term "about" and "substantially" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation.

Any implementation may be combined with any other implementation, inclusively or exclusively, in any manner consistent with the aspects and implementations disclosed herein.

The indefinite articles "a" and "an," as used herein in the specification and in the claims, unless clearly indicated to the contrary, should be understood to mean "at least one."

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for analyzing visual content items, the system comprising:
    a memory; and
    one or more processors coupled to the memory, wherein the one or more processors include programmed instructions to:
        access, from a mobile computing device, a plurality of visual content items captured by the mobile computing device;
        evaluate the plurality of visual content items to determine a respective similarity score between the plurality of visual content items and each of a plurality of identity categories, wherein evaluating the plurality of visual content items comprises applying at least one machine learning model to the plurality of visual content items for each of the plurality of identity categories;
        determine a subset of the identity categories for which the respective similarity scores exceed a similarity threshold;
        generate information corresponding to a first graphical user interface (GUI), the first GUI comprising a visual representation of each identity category of the subset of identity categories and a user-selectable interface element for each identity category of the subset of identity categories;
        provide the information corresponding to the first GUI to the mobile computing device to cause the mobile computing device to render the first GUI via an electronic display of the mobile device;
        receive a first user input corresponding to a selection of at least one identity category of the subset of identity categories;
        identify a target audience for a user of the mobile computing device;
        determine activity data for a plurality of published content items retrieved from at least one content source, the published content items selected based on the at least one identity category, wherein the activity data comprises data relating to engagement of viewers with the plurality of published content items;
        train a second machine learning model to determine a predicted performance score based on the published content items and the activity data;
        evaluate each visual content item of the plurality of visual content items using the second machine learning model to generate a respective predicted performance score for each visual content item of the plurality of visual content items;
        generate information corresponding to a second GUI, the second GUI comprising a visual representation of at least a subset of the plurality of visual content items and the respective predicted performance scores for the subset of the plurality of visual content items; and
        provide the information corresponding to the second GUI to the mobile computing device to cause the mobile computing device to render the second GUI via the electronic display of the mobile device.

2. The system of claim 1, wherein the one or more processors further include programmed instructions to:
    provide information corresponding to a third GUI to the mobile computing device, the third GUI comprising a list of a plurality of candidate audiences;
    receive, from the mobile computing device, a second user input corresponding to a selection of a first candidate audience of the plurality of candidate audiences; and
    identify the target audience based on the second user input.

3. The system of claim 1, wherein the one or more processors further include programmed instructions to:
    access a first account on the target platform corresponding to the user of the mobile computing device;
    identify a plurality of second accounts on the target platform, each second account linked with the first account; and
    identify the target audience based on the plurality of second accounts.

4. The system of claim 1, wherein the one or more processors further include programmed instructions to:
    detect that a new visual content item has been captured by the mobile computing device, the new visual content item not included in the plurality of visual content items; and
    automatically evaluate the new visual content item using the second machine learning model based on the published content items and the activity data to generate a respective predicted performance score for the new visual content item, responsive to detecting that the new visual content item has been capture by the mobile computing device.

5. The system of claim 1, wherein the one or more processors further include programmed instructions to:
    generate the information corresponding to the second GUI such that the second GUI comprises the visual representations of the subset of the visual content items arranged in a rectangular array, wherein the respective predicted performance scores overlap at least a portion of the visual representations of their respective visual content items within the second GUI.

6. The system of claim 1, wherein the one or more processors further include programmed instructions to:
    access a new visual content item from a content source remote from the mobile computing device;

evaluate the new visual content item using the second machine learning model based on the published content items and the activity data to generate a respective predicted performance score for the new visual content item;

determine that the predicted performance score for the new visual content item exceeds a predetermined predicted performance threshold; and provide the new visual content item to the mobile computing device.

7. The system of claim 1, wherein the one or more processors further include programmed instructions to:
receive, from the mobile computing device, a second user input specifying a time period;
determine a timestamp of each visual content item of the plurality of visual content items; and
identify the subset of the plurality of visual content items for the second GUI such that the respective timestamp of each visual content item of the subset of visual content items falls within the time period.

8. The system of claim 1, wherein the one or more processors further include programmed instructions to:
identify a target content item characteristic;
for each visual content item of the plurality of visual content items, evaluate the visual content item to determine whether the visual content item includes the target content item characteristic; and
identify the subset of the plurality of visual content items for the second GUI such that each visual content item of the subset of visual content items includes the target content item characteristic.

9. The system of claim 8, wherein the one or more processors further include programmed instructions to:
receive, from the mobile computing device, a second user input corresponding to a search criteria text string; and
parse the search criteria text string to identify the target content item characteristic.

10. The system of claim 8, wherein the one or more processors further include programmed instructions to:
receive, from the mobile computing device, a second user input corresponding to an audio signal; and
parse the audio signal to identify the target content item characteristic.

11. The system of claim 1, wherein the one or more processors further include programmed instructions to:
identify a target content platform; and
select the at least one content source from which the published content items are retrieved to correspond to the target content platform.

12. The system of claim 1, wherein the one or more processors further include programmed instructions to:
train the second machine learning model based in part on the target audience.

13. The system of claim 1, wherein the one or more processors further include programmed instructions to:
train the second machine learning model using one or more features extracted from image data corresponding to at least one of the published content items.

14. The system of claim 1, wherein the one or more processors further include programmed instructions to:
evaluate the plurality of visual content items to determine the respective similarity score between the plurality of visual content items and each of the plurality of identity categories based on at least one of a percentage of the plurality of visual content items that correspond to each identity category or a quality rating of at least one of the plurality of visual content items that corresponds to each identity category.

15. A method for analyzing visual content items, the method comprising:
accessing, from a mobile computing device, a plurality of visual content items captured by the mobile computing device;
evaluating the plurality of visual content items to determine a respective similarity score between the plurality of visual content items and each of a plurality of identity categories, wherein evaluating the plurality of visual content items comprises applying at least one machine learning model to the plurality of visual content items for each of the plurality of identity categories;
determining a subset of the identity categories for which the respective similarity scores exceed a similarity threshold;
generating information corresponding to a first graphical user interface (GUI), the first GUI comprising a visual representation of each identity category of the subset of identity categories and a user-selectable interface element for each identity category of the subset of identity categories;
providing the information corresponding to the first GUI to the mobile computing device to cause the mobile computing device to render the first GUI via an electronic display of the mobile device;
receiving a first user input corresponding to a selection of at least one identity category of the subset of identity categories;
identifying a target audience for a user of the mobile computing device;
determining activity data for a plurality of published content items retrieved from at least one content source, the published content items selected based on the at least one identity category, wherein the activity data comprises data relating to engagement of viewers with the plurality of published content items;
training a second machine learning model to determine a predicted performance score based on the published content items and the activity data;
evaluating each visual content item of the plurality of visual content items using the second machine learning model to generate a respective predicted performance score for each visual content item of the plurality of visual content items;
generating information corresponding to a second GUI, the second GUI comprising a visual representation of at least a subset of the plurality of visual content items and the respective predicted performance scores for the subset of the plurality of visual content items; and
providing the information corresponding to the second GUI to the mobile computing device to cause the mobile computing device to render the second GUI via the electronic display of the mobile device.

16. The method of claim 15, further comprising:
providing information corresponding to a third GUI to the mobile computing device, the third GUI comprising a list of a plurality of candidate audiences;
receiving, from the mobile computing device, a second user input corresponding to a selection of a first candidate audience of the plurality of candidate audiences; and
identifying the target audience based on the second user input.

17. The method of claim 15, further comprising:
accessing a first account on the target platform corresponding to the user of the mobile computing device;
identifying a plurality of second accounts on the target platform, each second account linked with the first account; and
identifying the target audience based on the plurality of second accounts.

18. The method of claim 15, further comprising:
detecting that a new visual content item has been captured by the mobile computing device, the new visual content item not included in the plurality of visual content items; and
evaluating the new visual content item using the second machine learning model based on the published content items and the activity data to generate a respective predicted performance score for the new visual content item, responsive to detecting that the new visual content item has been capture by the mobile computing device.

19. The method of claim 15, further comprising:
generating the information corresponding to the second GUI such that the second GUI comprises the visual representations of the subset of the visual content items arranged in a rectangular array, wherein the respective predicted performance scores overlap at least a portion of the visual representations of their respective visual content items within the second GUI.

20. The method of claim 15, further comprising:
accessing a new visual content item from a content source remote from the mobile computing device;
evaluating the new visual content item using the second machine learning model based on the published content items and the activity data to generate a respective predicted performance score for the new visual content item;
determining that the predicted performance score for the new visual content item exceeds a predetermined predicted performance threshold; and
providing the new visual content item to the mobile computing device.

21. The method of claim 15, further comprising:
receiving, from the mobile computing device, a second user input specifying a time period;
determining a timestamp of each visual content item of the plurality of visual content items; and
identifying the subset of the plurality of visual content items for the second GUI such that the respective timestamp of each visual content item of the subset of visual content items falls within the time period.

22. The method of claim 15, further comprising:
identifying a target content item characteristic;
for each visual content item of the plurality of visual content items, evaluating the visual content item to determine whether the visual content item includes the target content item characteristic; and
identifying the subset of the plurality of visual content items for the second GUI such that each visual content item of the subset of visual content items includes the target content item characteristic.

23. The method of claim 22, further comprising:
receiving, from the mobile computing device, a second user input corresponding to a search criteria text string; and
parsing the search criteria text string to identify the target content item characteristic.

24. The method of claim 22, further comprising:
receiving, from the mobile computing device, a second user input corresponding to an audio signal; and
parsing the audio signal to identify the target content item characteristic.

25. The system of claim 15, further comprising:
identifying a target content platform; and
selecting the at least one content source from which the published content items are retrieved to correspond to the target content platform.

26. The method of claim 15, further comprising:
training the second machine learning model based in part on the target audience.

27. The method of claim 15, further comprising train the second machine learning model using one or more features extracted from image data corresponding to at least one of the published content items.

28. The method of claim 15, further comprising evaluating the plurality of visual content items to determine the respective similarity score between the plurality of visual content items and each of the plurality of identity categories based on at least one of a percentage of the plurality of visual content items that correspond to each identity category or a quality rating of at least one of the plurality of visual content items that corresponds to each identity category.

* * * * *

UNITED STATES PATENT AND TRADEMARK OFFICE
CERTIFICATE OF CORRECTION

PATENT NO. : 10,592,074 B2
APPLICATION NO. : 16/403336
DATED : March 17, 2020
INVENTOR(S) : Jehan Hamedi, Zachary Halloran and Elham Saraee Page 1 of 1

It is certified that error appears in the above-identified patent and that said Letters Patent is hereby corrected as shown below:

On the Title Page

Item [75], should read:
Inventors: Jehan Hamedi, South Boston, MA (US)
Zachary McDonald Halloran, Braintree, MA (US)
Elham Saraee, Jamaica Plain, MA (US)

Signed and Sealed this
Twenty-fifth Day of October, 2022

Katherine Kelly Vidal
*Director of the United States Patent and Trademark Office*